May 27, 1969        F. I. WHITTEN        3,446,469

SCISSOR SHOCK PLATFORM

Filed Nov. 14, 1967

INVENTOR
FRANK I. WHITTEN

BY

ATTORNEYS

INVENTOR
FRANK I. WHITTEN

BY
*Albert Hopp*
*D. E. Hodges*
ATTORNEYS

United States Patent Office 3,446,469
Patented May 27, 1969

3,446,469
SCISSOR SHOCK PLATFORM
Frank I. Whitten, Bethesda, Md., assignor to the United States of America as represented by the Secretary of the Navy
Filed Nov. 14, 1967, Ser. No. 682,838
Int. Cl. A47b 95/00, 91/00; B60r 21/10
U.S. Cl. 248—346                    7 Claims

ABSTRACT OF THE DISCLOSURE

A top plate or platform carrying personnel or equipment to be protected is carried by two panel-form torsionally stiff scissor elements, there being a center hinge rod for the scissor elements and an upstanding crushable, disposable insert supporting the scissor elements against the platform at each end. The scissors elements are supported by a base member in which the elements may slide when there is shock loading.

---

The invention described herein may be manufactured and used by or for the Government of the United States of America for governmental purposes without the payment of any royalties thereon or therefor.

Background of the invention

There is a need for a platform for safeguarding personnel and equipment from shock caused by explosions from points beneath the platform or by dropping of the platform.

Personnel and equipment are particularly exposed to injury and damage when located on vehicles or vessels traversing over mine-laden surfaces—land and water. The human body can survive shocks of several G's—10 or 15—over short periods of time, without serious injury. An explosion occurring beneath, say, a landing craft, can seriously injure all personnel aboard because G forces far in excess of 10–15 G's will be exerted on the hull of the craft through the water.

The prior art is replete with shock absorbing devices of wide variety. The principle of shock absorption by crushing is old. For example, piles of crushable cardboard boxes are shock absorbers. More recently, a crushable steering column element has been invented which, upon impact, collapses axially with very little spring effect.

Summary of the invention

The present invention employs the aforementioned crushable steering column shock absorber or equivalent as part of an overall, unique combination of elements forming a platform which, when not in use, can be folded to a flat position in the bottom of a boat so that vehicles or other cargo can be loaded without appreciable loss of space.

When in use, the platform is extended to an upraised position according to the movements of scissors type cross pieces on each side of the platform. Each scissors element rotates about a central pin and is supported at each upraised end by a shock absorbing unit comprising by way of example a group of General Motors or Ford axially crushable steering column shock absorbers, currently available on the open market. It has been found that four of such steering column shock absorbers upstandingly supporting each end of the scissors elements are sufficient to enable without criticality of load distribution shock absorbing buckling action of a human load responsive to forces to a maximum of about 12 G's. Of course, any other suitable axially crushable elements may be employed.

A particular advantage of the arrangement according to the invention is that, in addition to the foldability of the platforms, each group of shock absorbing units may be replaced after deformation due to shock, each of said units as well as the entire platform being easily fabricated by relatively unskilled labor. In fact, the shock absorbing units and platforms can be jury-rigged if necessary—an important advantage under combat conditions.

Another advantage of this invention stems from the fact that after explosive shock, the only damaged items are the crushable shock absorbing units, the scissors type construction of the platform supports being of high strength and highly stiff under torsional stress, so that the platform and its scissors elements merely collapse intact to a contracted or nearly folded position under explosive shock. Thus, all elements of the platform are immediately reusable save the shock absorbing units which may be easily disposed of and replaced.

Brief description of the drawings

Reference is now made to the drawings in which like reference numerals represent like parts and in which.

Detailed description of the invention

Figure 1:
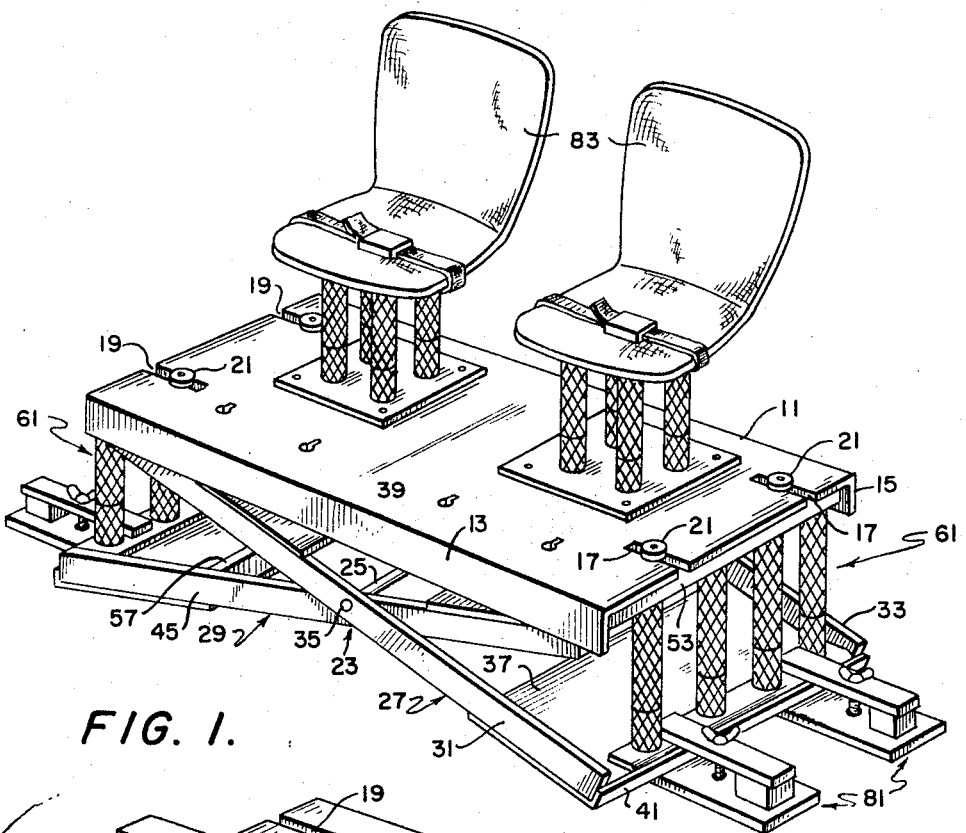
FIGS. 1 and 2 are views in perspective of the scissors shock platform according to the invention in extended and retracted positions respectively.
Figure 2:
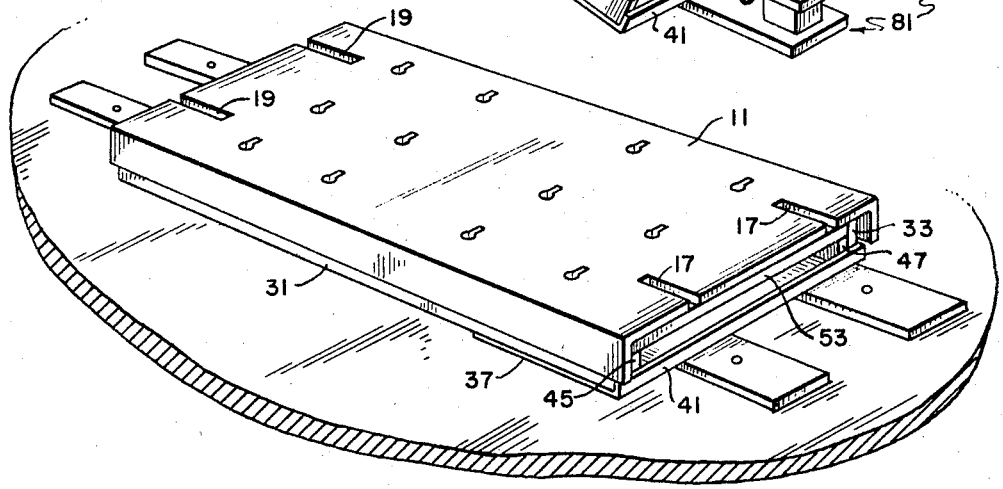

Referring to FIGS. 1 and 2, the scissors shock platform of the invention comprises a top plate 11 having downwardly extending opposing side walls 13 and 15. The top plate 11 may be elongated as shown and have at one end a pair of holes 17 and at the other end a pair of holes 19 therein for receiving means such as locking bolts 21 for securing the unit. The top plate may be fabricated of any suitable stiff, rigid material such as cast aluminum, steel, fiberglass or the like.

Supporting the top plate 11 is a scissors unit 23 comprising a central transverse pin or rod 25 about which outer scissors element 27 and inner scissors element 29 respectively rotate. The scissors elements 27 and 29 are generally alike in form and thus will be distinguished only as to differences. For example, it is understood that as shown scissors unit 29 is narrower than 27 so that it may fit for rotation within the confines of scissors element 27 to extend and retract to the flat position shown in FIG. 2.

Figure 3:
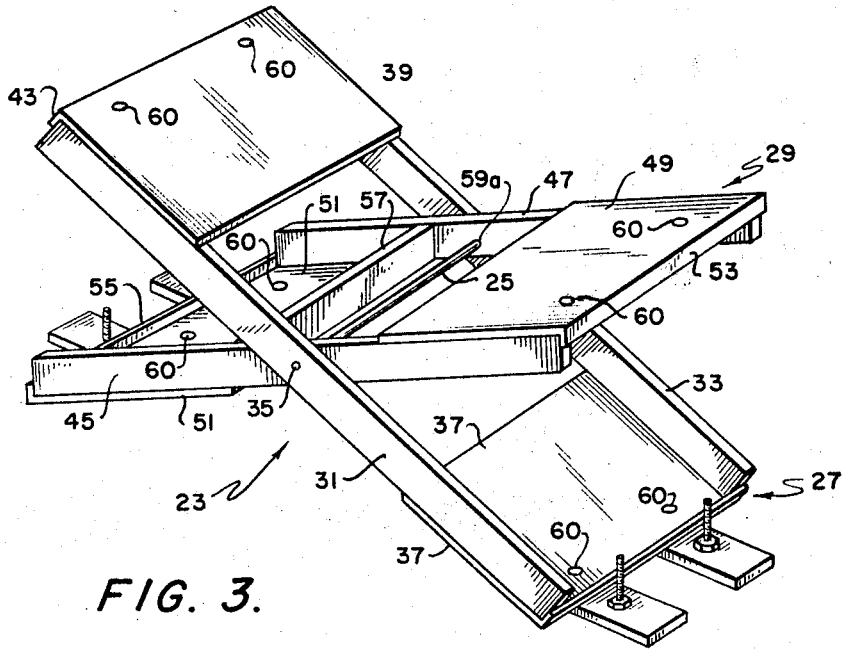
FIG. 3 is a view in perspective of a scissors unit according to the invention.

Referring to FIG. 3, the outer scissors element 27 includes two opposing, parallel side arms 31 and 33 of stiff construction which may for light weight be made of cast or extruded aluminum of hollow rectangular transverse cross section. Any other suitable rigid material may be employed, of any convenient cross section, so long as the arms do not bend appreciably under operational load conditions. A hole 35 is bored through the center of each arms 31 and 33 to receive the rod 25 therethrough.

The arms 31 and 33 are fastened rigidly at each end by means of rigid cast aluminum panels 37 and 39 respectively, as by welding or any other suitable means. The panel 37, shown at the lower end of the expanded scissors unit in FIGS. 1 and 3 has its panel welded to the bottom side of each of the arms 31 and 33. At the other raised end of the scissors unit 27, the panel 39 is welded to the opposite or top side of each of the arms 31 and 33. Each of the panels 37 and 39 extends longitudinally about ⅓ the length of the arms, this construction increasing rigidity between the arms 31 and 33 and further preventing twisting of the arms per se and relative to each other. Each of the panels 37 and 39 has its end bent over the ends of arms 31 and 33 to form respective transverse walls thereat designated 41 and 43.

Inner scissors element 29 is narrower than outer scissors element 27 and has the same unitary construction rigidly interconnecting its arms 45, 47 and panels 49 and 51 with respective end walls 53 and 55. In addition, scissors element has transverse stiffening beams 57 and 59 underlying respective panels 49 and 51 and welded thereto for providing support when the platform is folded flat. Beams 57 and 59 are also welded to arms 45 and 47 and may be of the same material and cross section as arms 45, 47, 31 and 33. A hole 59a is bored in each of the arms 45, 47 in registry with holes 35 in arms 31 and 33 to receive rod 35 for rotation thereabout. Scissors element 29 is sufficiently narrower than element 27 to enable free rotation of the elements relative to each other without binding.

With the unit assembled to the extent shown in FIG. 3, the scissors elements 27 and 29 when extended provide at their end walls 41 and 43 and 53, 55 inward turned corners for positive support of the axially crushable units.

Each of the rigid panels 37, 39, 49 and 51 has holes 60 bored therein for registration with holes 17 and 19 of platform 11.

Figure 4:
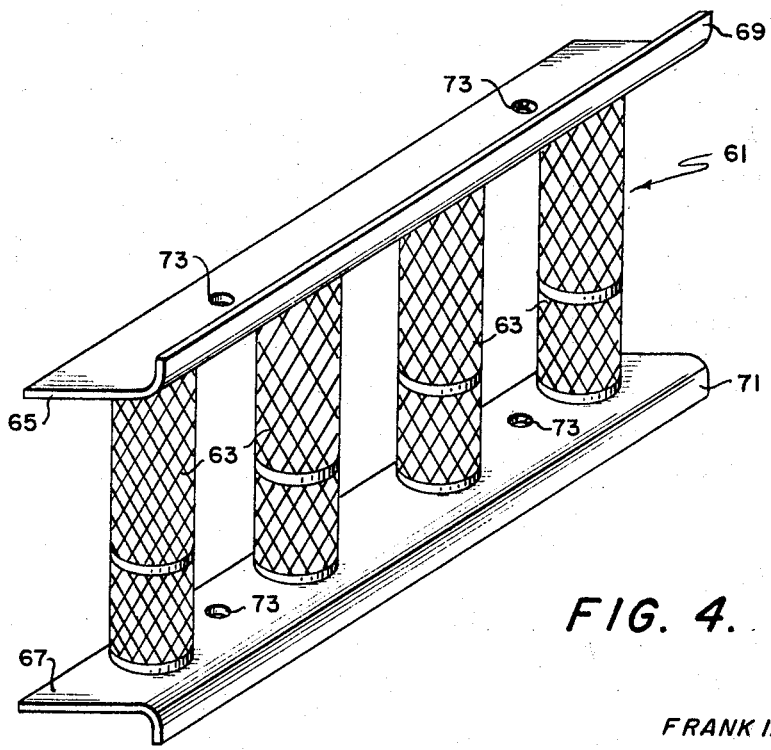
FIG. 4 is a view in perspective of an axially crushable unit according to the invention.

Referring to FIG. 4 there is shown one of the axially crushable units 61 fabricated according to the invention. The unit 61 comprises a plurality of elements, say 4, of the Ford or General Motors type commercially available steering column shock absorbers 63. The details of construction of each crushable element will not be described since they are well known off-the-shelf items. However, the construction of unit 61 includes two opposing end supports 65 and 67 L-shaped in transverse cross section to provide walls 69 and 71 extending in opposite directions from each other at the top and bottom of unit 61. Holes 73 are provided in each end support so that when the unit is assembled the bolts 21 may pass through the plate or platform holes 17 and 19, holes 60 of the scissors unit and holes 73 of the axially crushable units.

*Assembly and operation*

The scissors shock platform of the invention is assembled by inserting at each end of the scissors unit 23 one of the crushable shock absorbing units 61 described in FIG. 4. The units 61 are positioned so that holes 73 are in alignment with holes 60 at each end. Such alignment is facilitated by the walls 67 and 69 of each unit 61 being dimensioned to insure vertical positioning of the units 61 in relation to the inclined surfaces of the panels 37, 39, 49, 51. The abutting cooperation of walls 67 and 69 with walls 41, 43 and 53, 55, also serves to prevent lateral movement of the crushable units 61.

Next, the top plate or platform 11 is shipped over the scissors unit 23 and the bolts 21 brought home through the aligned holes of the plate 11, the upraised panels of the scissors unit and the crushable units.

As shown in FIG. 1 both ends of the scissors shock platform may be secured to a deck or floor by means blocks 81 themselves fastened together and to the deck by bolts or any other suitable means. As shown the blocks 81 are arranged to enable lateral outward sliding movement of the lower ends of the scissors unit 23.

One or more chairs 83 supported by crushable shock absorbers may be mounted on the platforms for personnel, if desired, to provide additional shock force distribution and protection. Of course, a plurality of the shock platforms may be deployed on a deck or floor, say, of landing craft, helicopter, tank, etc. as needed, to protect equipment and personnel. The apparatus of the present invention may also be employed to reduce shock for cargo dropped from aircraft by placing the platform beneath a properly oriented cargo package to be dropped.

In operation, when shock force acts on the platform 11, the inertia of the load carried by the platform resists the shock force thus loading the platform. The crushable units 61 have negligible spring resistance, and begin deforming almost immediately under the force of the descending top plate 11 acting on scissors elements 27 and 29. Because the scissors elements rotate about rod 25, the ends of the elements 27, 29 describe an arc with the rod 25 as origin as the platform retracts under shock force. This arc causes a slight bending of the elements 61 during reaction to shock. However, the extent of bending is insufficient to have deleterious effect on the fundamentally axial direction of crushing within elements 63. For example, it is unnecessary to locate the scissors elements so that there is greater than a 30° angle therebetween.

The rigid scissors configuration supporting the top plate as described herein affords equal distribution of loads to the column-like shock absorbing elements even though the loads are asymmetrically distributed on the top plate. Thus, shock absorbing action occurs even though only one end of the platform is provided with a shock absorbing unit 61. Even though only one side of the platform is loaded, with two units 61 provided as described according to the invention, equal distribution of shock absorption by crushing is thus assured despite load distribution.

It is further understood that although crushable elements of a particular known off-the-shelf design have been employed, crushable elements of other design may be employed in lieu thereof. For example, stiff cellular products, thin walled cylinders, sets of thin rods all may be designed to buckle at their respective material yield points.

Obviously many modifications and variations of the present invention are possible in the light of the above teachings. It is therefore to be understood that within the scope of the appended claims the invention may be practiced otherwise than as specifically described.

What is claimed is:

1. A load distributing shock absorbing device comprising:
   a top plate having opposing ends for carrying a load to be protected against shock;
   a pair of cross members, said cross members being coaxially pivotable one within the other about a central axis common to central portions of both said members, each of said members having an upper end abutting one of the opposing ends of said top plate;
   pivot means for said cross members located at said central axis; and
   axially deformable means for supporting at least one of the upper ends of said pivotable cross members in an extended position whereby upon occurrence of predetermined shock loading of the device said cross members pivot about their central axis to deform said deformable means under the inertia of the load.

2. The device according to claim 1 wherein each of said cross members comprises:
   a pair of spaced apart, essentially rigid, parallel arms; and
   an essentially rigid panel means interconnecting the same ends of each pair of parallel arms to prevent twisting of said cross members.

3. The device according to claim 2 wherein the rigid panel means comprises a panel secured to the lowermost side of one end of each pair of arms and to the uppermost side of the other end of each pair of arms, the adjacent upper and lower ends of the respective pairs of arms when extended having respectively a panel on the uppermost side of the upper arms and a panel on the lowermost side of the lower arms whereby when the cross members are retracted into a collapsed position, said panels remain free of mutual contact and said members close one within the other to a flat position.

4. The device according to claim 3 wherein each of said panels has at its end farthest from the axis a transverse wall extending toward the adjacent cross member at each end of the top plate thereby enabling location of said axially deformable shock absorbing means between adjacent ends of said cross members.

5. The device according to claim 1 wherein each of said axially deformable means comprises a plurality of axially deformable elements lateraly spaced from each other, and upper and lower lateral members of rigid construction supporting the upper and lower ends of said plurality of axially deformable elements against the cross members.

6. The device according to claim 1 wherein the axially deformable means crushes at the predetermined load of about 8 G's to 15 G's.

7. The device according to claim 1 wherein said pivot means comprises a rod extending transversely through aligned central openings of said cross members.

References Cited

UNITED STATES PATENTS

| 2,953,189 | 9/1960 | Barash | 297—216 |
| 3,143,321 | 8/1964 | McGehee et al. | 244—100 |

FOREIGN PATENTS

| 744,577 | 2/1956 | Great Britain. |

CHANCELLOR E. HARRIS, *Primary Examiner.*

J. PETO, *Assistant Examiner.*

US. Cl. XR.

108—44; 297—216